US00RE34263E

United States Patent [19]

vanKerkhoven, deceased et al.

[11] E Patent Number: Re. 34,263

[45] Reissued Date of Patent: May 25, 1993

[54] END CLOSURE HAVING A PUSH OPEN LID PORTION

[75] Inventors: John vanKerkhoven, deceased, late of Wausau, Wis., by Lois M. vanKerkhoven, personal representative; James Kick, Ellisville, Mo.

[73] Assignee: The Specialty Packaging Group, Inc., Wausau, Wis.

[21] Appl. No.: 809,271

[22] Filed: Dec. 16, 1991

Related U.S. Patent Documents

Reissue of:

[64] Patent No.: 4,969,572
Issued: Nov. 13, 1990
Appl. No.: 389,581
Filed: Aug. 4, 1989

[51] Int. Cl.[5] ..... B65D 51/18

[52] U.S. Cl. ..... 220/253; 220/258; 220/268; 220/335; 220/379; 222/153; 222/541; 222/548

[58] Field of Search ..... 220/253, 254, 258, 259, 220/268, 335, 336, 379, 744; 222/153, 541, 548

[56] References Cited

U.S. PATENT DOCUMENTS

| | | | |
|---|---|---|---|
| 3,239,111 | 3/1966 | La Croce | 222/548 X |
| 3,847,300 | 11/1974 | Waters | 220/269 |
| 3,994,411 | 11/1976 | Elfelt et al. | 220/269 X |
| 4,253,583 | 3/1981 | Shields | 220/269 |
| 4,399,928 | 8/1983 | Klingler | 220/335 |
| 4,541,541 | 9/1985 | Hickman et al. | 220/253 |
| 4,775,065 | 10/1988 | Shastal | 220/335 X |
| 4,895,298 | 1/1990 | Reil | 220/335 X |
| 5,085,331 | 2/1992 | Groya et al. | 220/335 X |

*Primary Examiner*—Allan N. Shoap
*Assistant Examiner*—Nova Stucker
*Attorney, Agent, or Firm*—Cushman, Darby & Cushman

[57] ABSTRACT

An end closure for a container for grated or powered products having a push open lid portion for providing access to material within the container and a rotatable closure portion for selectively closing off the opening defined by the push open lid portion. The push open lid portion includes elements on the openable lid portion which cooperate with corresponding gripping elements defined on the undersurface of the end closure so the latter will engage the former to retain the lid portion in its open disposition.

13 Claims, 8 Drawing Sheets

END CLOSURE HAVING A PUSH OPEN LID PORTION

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to end closures for containers having a push open lid portion for providing access to material within the container. The end closure includes a base portion fixed to the container having an initially closed lid or flap portion and a flat bottomed rotatable closure portion for selectively closing off the opening defined by the push open lid portion. The rotating portion is retained on the base by its marginal edges so that the base remains intact until opened. More particularly, the present invention relates to an end closure having a push open lid portion and which includes one or more elements for cooperating with corresponding gripping elements to hold the lid portion in its open position.

2. Description of the Related Art

Many food and drink products such as grated cheese, herbs and seasonings, and powdered drinks are provided in containers with plastic closures having a rotatable portion with a permanent opening through a portion thereof which selectively provides access to an opening through a lower portion of the container closure. The opening through the lower portion is typically defined by an openable lid portion which is pushed towards the container interior so as to break a seal defined between the openable lid portion and the remainder the closure. After the frangible seal is broken, the openable lid portion flexes or bends about a "living hinge" which permanently connects the lid portion to the remainder of the closure. In this manner, the end closure can be used to seal the contents of the container prior to use and, when it is desired to access the container contents, the rotatable portion of the lid can be rotated so that the opening therethrough is aligned with the openable lid portion. Pressure is then applied to the openable lid portion to punch open the same and cause the openable portion to bend about the living hinge. When it is desired to temporarily close off the thus opened lid, the rotatable portion of the lid is rotated to cover the opening defined by the openable lid portion.

Such containers are advantageous as they allow selective access to the container contents while providing a closure for the contents between uses. However, a disadvantage with such end closures is that the lid portion which has been pushed open, due to the resilience of the living hinge, tends to flex back towards its closed portion thereby restricting the size of the pour opening. This particularly occurs when the container is inverted to pour powdered material or the like from therewithin. Occasionally, the lid portion can almost completely block the opening in the closure. It would therefore be desirable to provide a structure which retains the openable lid portion in its open position so that it will not interfere with access to the container contents.

FIGS. 1–7 show various prior attempts to develop end closures that exhibit a type of flat rotor that was rotatably retained on a base without use of a rivet type connector or a mechanism to hold a press-open lid in an open position.

FIGS. 1 and 2 correspond to a type of end closure suitable for placement at the end of a container to close the interior. The end closure is comprised of a base and a rotor retained on the base and in a central portion of the base which extends radially outwardly from the rotor. The periphery of the rotor is provided with a raised or upwardly extending edge that includes a substantially C-shaped cross-section annular ring that corresponds to a reverse C-shaped cross-sectional retaining groove formed within the base. The bottom surface of the rotor was essentially a flat planar surface and included a cut-out opening and shaker openings. The base include a smile-shaped knockout panel which would be opened by removing the entire piece of plastic. The base was also characterized by two levels, one corresponding to the surface, that extended radially outwardly from the rotor, the other located beneath the rotor.

The end closure shown in FIGS. 3–5 is another version where the rotor, so marked, also had a flat planar bottom surface. The rotor was held in the base, as marked, by means of an annular extension projecting slightly beyond the peripheral edge of the rotor and a mating groove formed in the base. Both the annular extension and groove were radiused. The bottom surface of the rotor was spaced above the upper surface of the base against which it was positioned forming an open space therebetween in which debris or material from the container could collect. Also, the radiused extension/groove approach for retaining the rotor on the base was not sufficiently positive to hold the rotor in place and provide a suitable seal for the contents inside the container.

The end closure shown in FIGS. 6–7 shows a closure that holds the openable lid open. The bottom plan view of the base in FIG. 6 and the cross-sectional view in FIG. 7 shows the use of two tapered conical projections that extended downwardly from the bottom surface of the base toward the interior of the container on which the end closure would be used. The push open lid or flap is characterized by a straight hinge along its rear edge. Two straight sides diverge at oblique angles away from opposing ends of the hinge toward the front of the lid terminating at an arched front edge which joins the outer ends of those straight sides. The straight sides provide a special shape that will pass beyond the tapered projections to the position shown in FIG. 7 with minimum interference yet provide sufficient contact so that the projections hold the flap open. Depending upon the stiffness of the plastic of the hinge and the lid, the lid would need to be bent beyond 90° to move the lid beyond the projections in order to arrive at the position shown for the flap in FIG. 7. FIGS. 6a and 6b show top and bottom plan views of the rotor used on this end closure. The rotor was characterized by planar top and bottom surfaces, by a square cornered peripheral edge that mated with a radiused groove, as shown in FIG. 7, which was similar to the groove shown in FIG. 5 for retaining the rotor.

SUMMARY OF THE INVENTION

It is a object of the present invention to provide a container closure as described above which includes a means for maintaining the pushed open lid portion in its open disposition. These and other objects are realized in accordance with the present invention by providing an end closure for a container having a substantially planar first lid portion including means for engaging an upper rim of a container to be closed and a second lid portion rotatable mounted to the upper surface of the first lid portion, the second lid portion having an opening defined therethrough. An openable lid portion is defined in the first lid portion and includes a flexible hinge along a first edge thereof and a frangible coupling along the remaining edges thereof. When a force is applied to the upper portion of said openable lid portion, the frangible seal is broken and the openable lid portion pivots about the hinge. A bottom surface of the first lid portion includes at least one gripping element and a bottom surface of the openable lid portion includes at least one tab element so that when pressure is applied to the openable lid portion and the openable lid portion pivots about the hinge, the gripping element engages the tab so as to retain the openable lid portion in an open disposition.

Other objects, features and characteristics of the present invention, as well as the methods of operation and functions of the related elements of the structure, and the combination of parts and economies of manufacture, will become more apparent upon consideration of the following detailed description and the appended claims with reference to the accompanying drawings all of which form a part of this specification, wherein like reference numerals designate corresponding parts in the various figures.

DETAILED DESCRIPTION OF THE PRESENTLY PREFERRED EXAMPLARY EMBODIMENT

Figure 1:
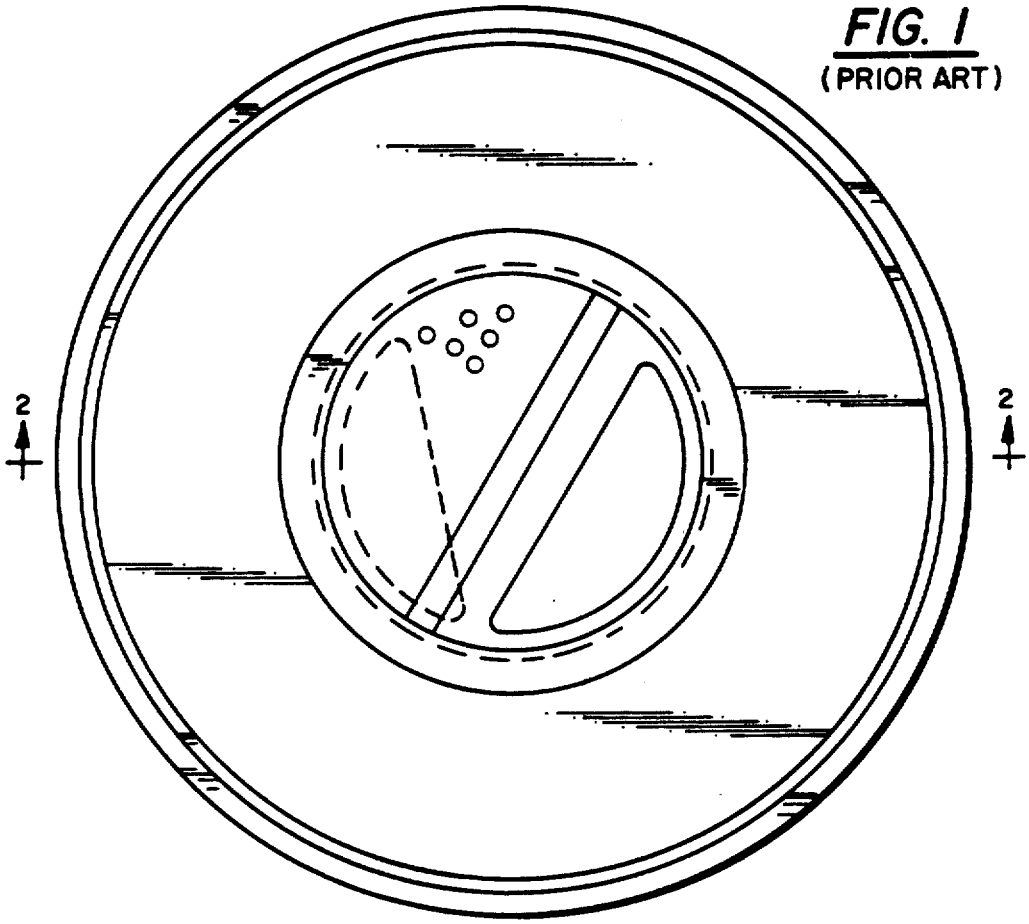
FIG. 1 (PRIOR ART)
FIG. 1 is a top plan view of a prior art end closure.
Figure 2:
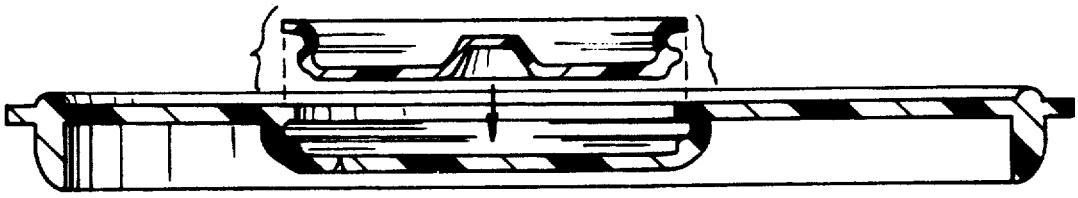
FIG. 2 (PRIOR ART)
FIG. 2 is a cross-sectional view taken along line 2—2 in FIG. 1.
Figure 4:
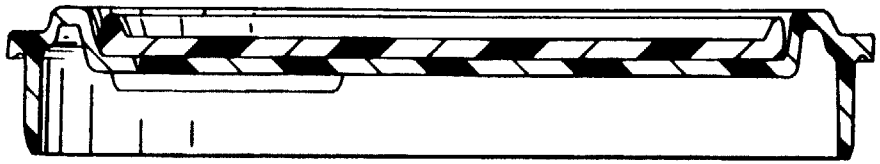
FIG. 4 (PRIOR ART)
FIG. 4 is a cross-sectional view taken along line 4—4 in FIG. 3.
Figure 5:
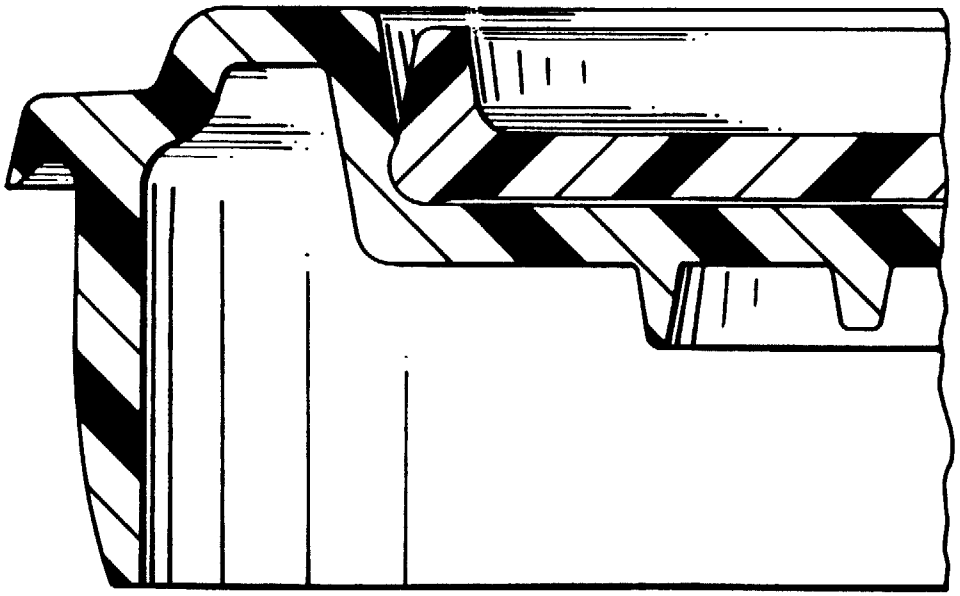
FIG. 5 (PRIOR ART)
FIG. 5 is an enlarged cross-sectional view of the peripheral edge of the closure shown in FIG. 4.
Figure 3:
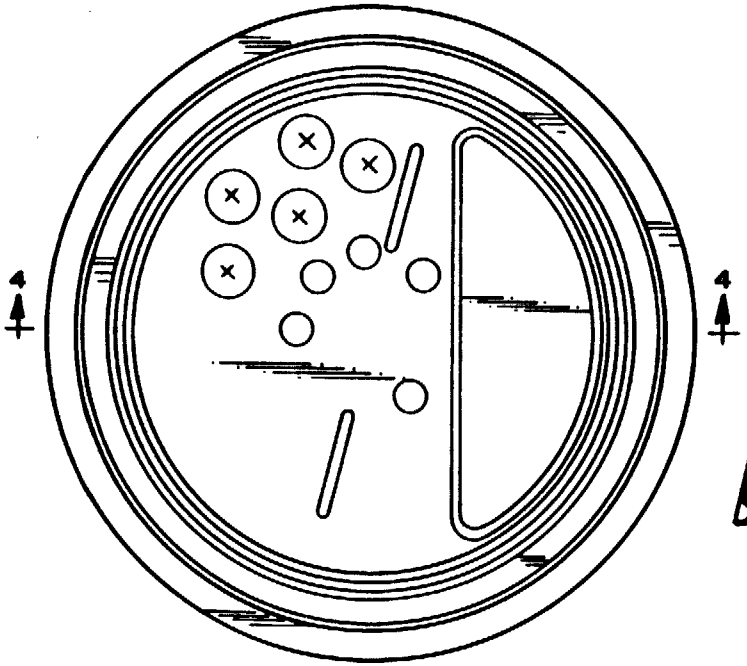
FIG. 3 (PRIOR ART)
FIG. 3 is a top plan view of another prior art end closure embodiment.
Figure 6:
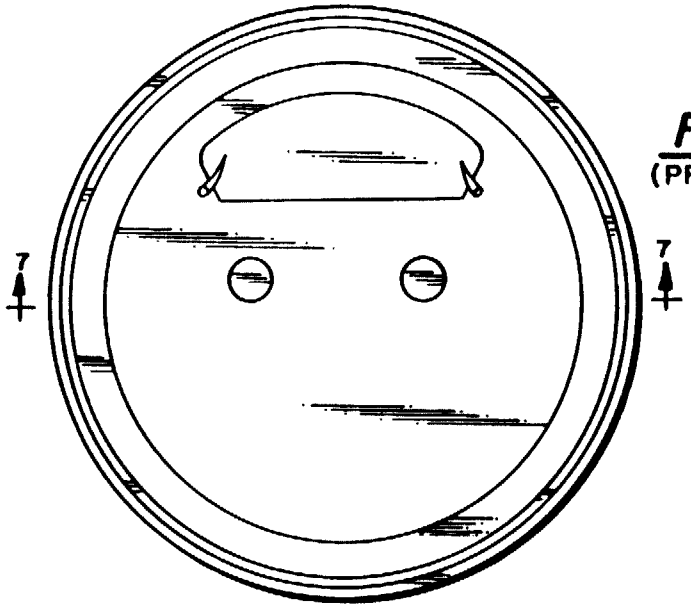
FIG. 6 (PRIOR ART)
FIG. 6 is a bottom plan view of a base from another prior art end closure embodiment.
Figure 6B:
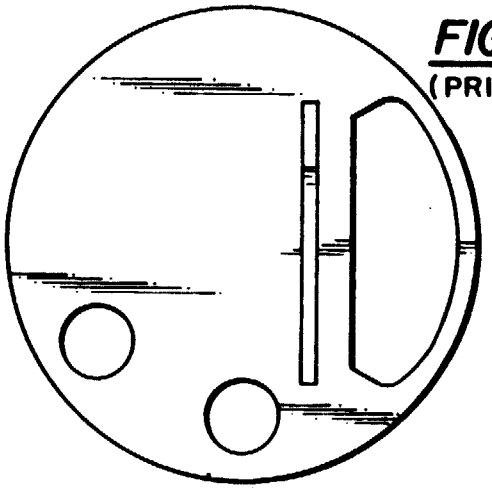
FIG. 6B (PRIOR ART)
FIG. 6B is a bottom plan view of the rotor shown in FIG. 6A.
Figure 6A:
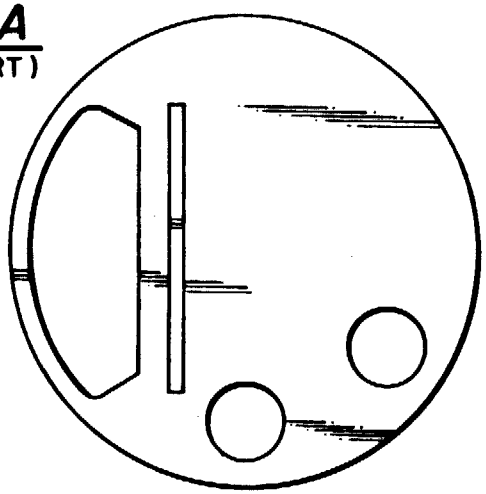
FIG. 6A (PRIOR ART)
FIG. 6A is a top plan view of a rotor.
Figure 7:
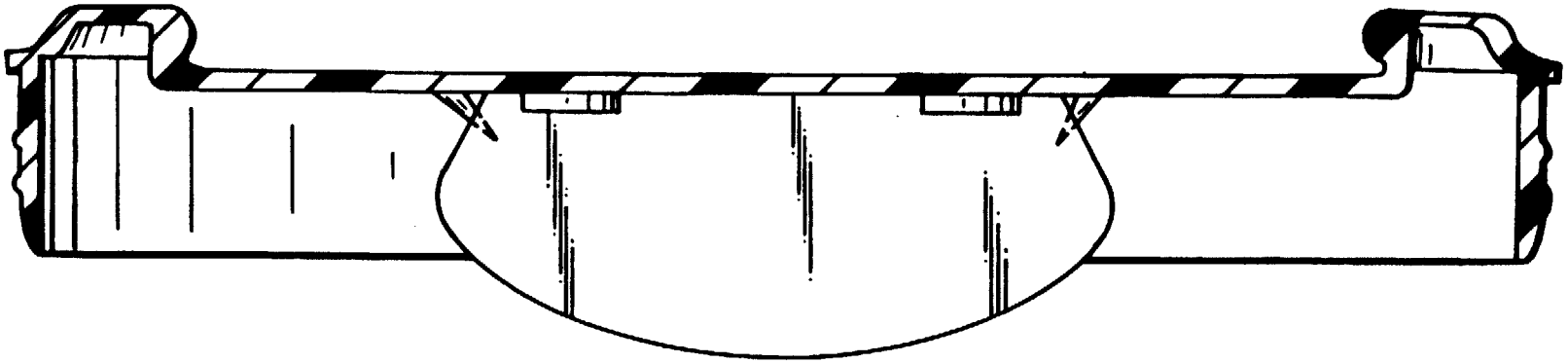
FIG. 7 (PRIOR ART)
FIG. 7 is a cross-sectional view taken along line 7—7 in FIG. 6.
Figure 8:
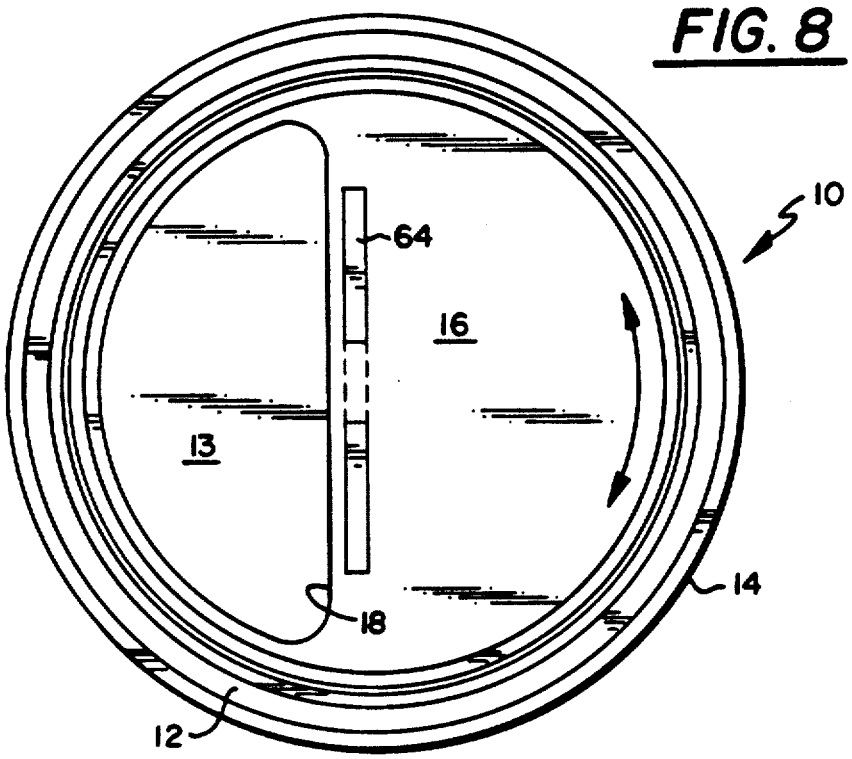
FIG. 8 is a top plan view of a closure lid provided in accordance with the present invention.

With reference now to FIG. 8, the top plan view of the end closure 10 provided in accordance with the present invention provides selective access to the interior of a container.

As can be seen, the end closure 10 includes a bottom or base generally shown at 12 which includes a substantially planar central lid portion 13. When constructed and initially placed on a container (not shown), this portion 13 is integral, it includes no openings and does not include any opening into the interior to rotatably support a rotor structure. The base 12 also includes a peripheral edge 14 which has a lip 15 downwardly therefrom for engaging a container top edge and for retaining the end closure on the same. The end closure further includes an upper substantially planar rotatable lid portion, generally shown at 16, which is snap mounted on the first lid portion or base 12 so as to be rotatable relative thereto.

Rotor 16 of the lid 10 includes a semicircular or smile shaped cutout portion or opening 18 which, as will become more apparent below, corresponds to the shape of an openable lid or flap portion 20 of base 12. When lid or flap 20 is opened it creates a semi-circular or smile shaped opening 22. Rotation of the rotatable portion 16 selectively aligns the cutout 18 with the openable lid portion 20 and opening 22 to thereby provide access to the container contents. Similarly, lid portion 16 can be rotated so that the cutout 18 is not directly aligned with opening 22 to either vary the size of the opening 22 or to completely close off the same with the nonperforated, solid area of the rotatable lid portion 16.

Figure 9:
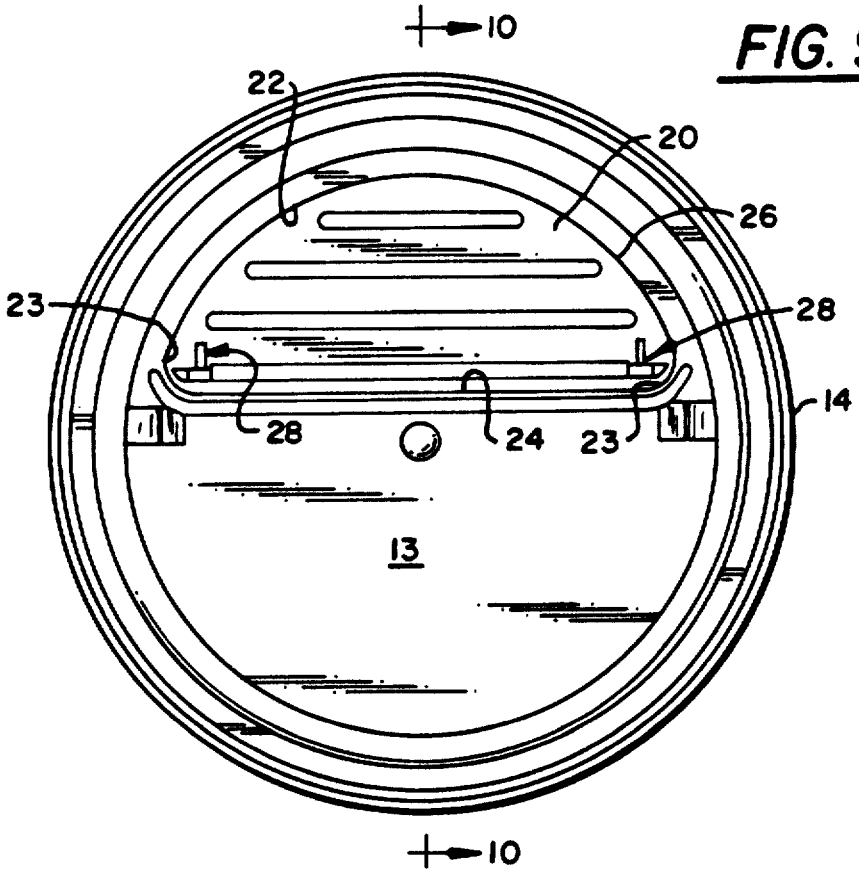
FIG. 9 is a bottom plan view of an end closure provided in accordance with the present invention.

Referring to FIG. 9, the semicircular openable lid portion 20, provided in accordance with the present invention, can be seen. As with conventional lids of this type, when this lid portion 20 is opened, it will produce a pour opening. Initially, however, all edges of this lid portion 20 are sealed making the closure secure. Because the planar portion 13 is initially a solid member any tampering of the closure or any attempt to get into the container on which the lid is mounted will result in movement of the lid portion 20. Since any such breach of the sealed edges about portion 20 cannot be repaired, tampering with the closure will be evident. Also, removal of the rotor 16 will not open the closure.

Figure 13:
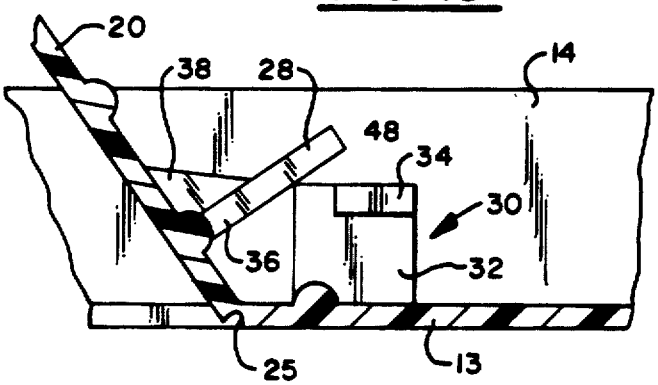
FIG. 13 is a side elevation view, partly, in cross section and partly broken away for clarity showing the openable lid portion its partially open disposition.
Figure 14:
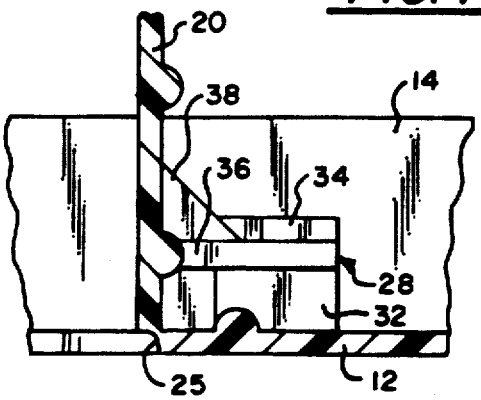
FIG. 14 is a view taken along line 4—4 of FIG. 11 and partly broken away for clarity.

The edges of lid portion 20 include an arched edge 26, curved end portion 23 of that arched edge, and a straight edge 24. The connection between the base 12 and the arched edge 26 and curved edges 23 is comprised of a solid yet frangible membrane seal 21. The planar portion 13 of base 12 and lid 20 have a thickness of about 0.033 inches. The frangible membrane 21 has a thickness of about $0.003 \pm 0.001$ inches. The connection, shown at 23, between base 12 and edge 24 is not frangible but its thickness of about $0.012 \pm 0.002$ inches allows that connection 23 to operate as a hinge connection 25 for lid 20, as shown in FIGS. 13 and 14. Consequently, even after the lid portion 20 has been opened, it will not fall into the container but will remain a part of the base 12. As mentioned above, the arched edge 26 of the lid portion 20, as shown in drawing FIG. 9, initially constitutes a frangible seal so that prior to opening a safe and secure seal is provided to retain and protect the container contents therewithin but which, with manual force from the top of the container, can be broken so as to pivot the openable lid portion 20 about the hinge 25.

The living hinge 25, defined between the openable lid portion 20 and the remainder of the container closure 12, exhibits a degree of resiliency and thus, after the openable lid portion 20 is opened it will tend to be disposed at an angle relative to the plane of the first lid portion 12 as shown for example in FIG. 13. Then, if the container is inverted or shaken to remove some material from within the same, the material can contact the angularly disposed openable lid portion 20 and push the lid into a closed or semi-closed condition. Thus, the openable lid portion 20 can disadvantageously interfere with removing contents from the container.

In order to avoid such interference, in accordance with the present invention, at least one tab element, designated generally at 28, is provided on the bottom surface of base 12 and specifically on he bottom of lid 20. Preferably two tab elements are provided, with one tab element at each longitudinal end of the living hinge 25 with both provided on the under surface of the openable lid portion 20. Further, gripping elements or retainers, generally shown at 30, are provided on the bottom portion of the base 12 adjacent but on the opposite side the living hinge 25 from tabs 28. The gripping elements 30 include a substantially vertically disposed wall portion 32 and an overhanging flange portion designated generally as 44.

Figure 12:
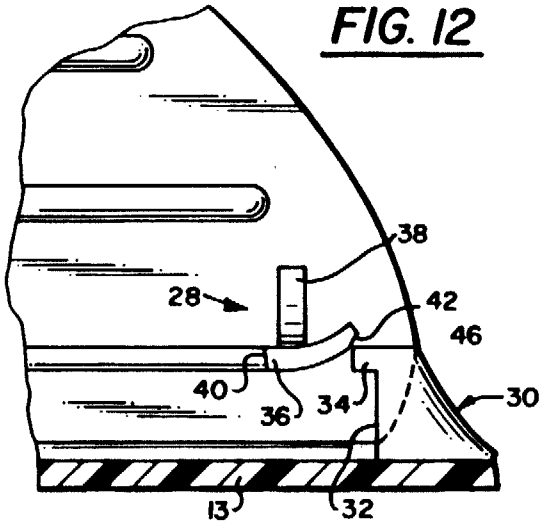
FIG. 12 is a side elevational view, partly in cross-section and partly broken away, showing the tab as it moves against the gripping elements.
Figure 11:
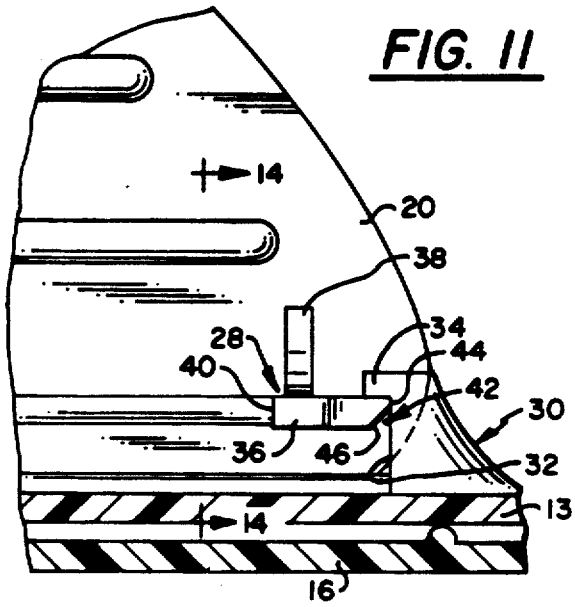
FIG. 11 is a side elevation view, partly in cross section and partly broken away from clarity showing the interlocking relation of a tab and a gripping element providing in accordance with the present invention with the openable lid portion in its open position.

The tabs 28 are comprised of an upstanding wall section 36 having a height sufficient to extend under flange 34 when the lid 20 is opened as shown in FIG. 14. The precise length of wall 36 is not critical so long as it can engage and be retained by flange 34. Tabs 28 also include a reinforcing member 38 in the form of a triangular wall extending between lid 20 and wall 36. As shown in FIG. 11, each wall 36 includes an inboard side 40 and an outboard side 42, the latter being the side that moves past flange 34. Side 42 can also have sliding contact with vertical wall 32. It should be noted that the reinforcing member 38 is positioned closer to inboard side 40 than side 42 so that, as shown in FIG. 12, as lid 20 is opened wall portion 36 can move or be deflected as side 42 contacts flange 34. Once side 42 clears flange 34 it will snap under that flange into the position shown in FIGS. 11 and 14 and be retained in that position. The reinforcing member 38 provides the proper amount of stiffness to wall 36 making it not so stiff it will resist bending movement yet stiff enough to provide a suitable retaining force for lid 20 under flange 34.

With reference again to FIG. 11, side 42 is itself comprised of an upper portion 44 that can be either flat or slightly radiused and a lower portion 46 that is beveled or angled from the end of the portion 44 to the opposite face.

It should also be noted that flange 34 does not extend across the full width of wall 32. Rather, as shown in FIG. 13, flange 34 extends across about three quarters of the width of wall 32 toward lid 20 leaving a portion of wall 32, designated generally, at 48, free of the flange. This provides additional turning radius for wall 36 as lid 20 is rotated toward its full open position and aids in allowing lid 20 to be easily opened, allows wall 32 to help guide side 42 of wall 36 as it is deflected by flange 34 and allows the lid 20 to be raised into a better angular position with respect to the gripping element 30 to thereby gain the leverage needed to effect the retaining and snapping movement. The beveled portion 46 also aids in developing the desired opening, eases the retaining process and permits a stiffer flange than might otherwise be possible.

Thus, as the openable lid portion 20 is pivoted to its open position as shown in FIG. 13 to its fully open portion as shown in FIG. 14, the tab elements 20, defined on the longitudinal edges of the living hinge 25 the openable lid portion 20, will engage and be deflected by or snap past the overhanging portion 34 of the gripping member 30. Once the tabs 28 are snapped past the gripping members 30 and the pressure on the openable lid portion 20 is released, it will be held in open position as shown in FIGS. 11 and 14 by the overhanging portion 34 of the gripping element 30. If desired, the openable lid portion 20 can be released from the gripping members 30 by applying a force tending to pivot it about its living hinge 25 towards the closed disposition. However, absent such positive manual force, the openable lid portion 20 will be retained in its open configuration and will not be "unlocked" by dispensing powdered material and the like from within the container, even if the can is inverted and shaken.

Figure 10:
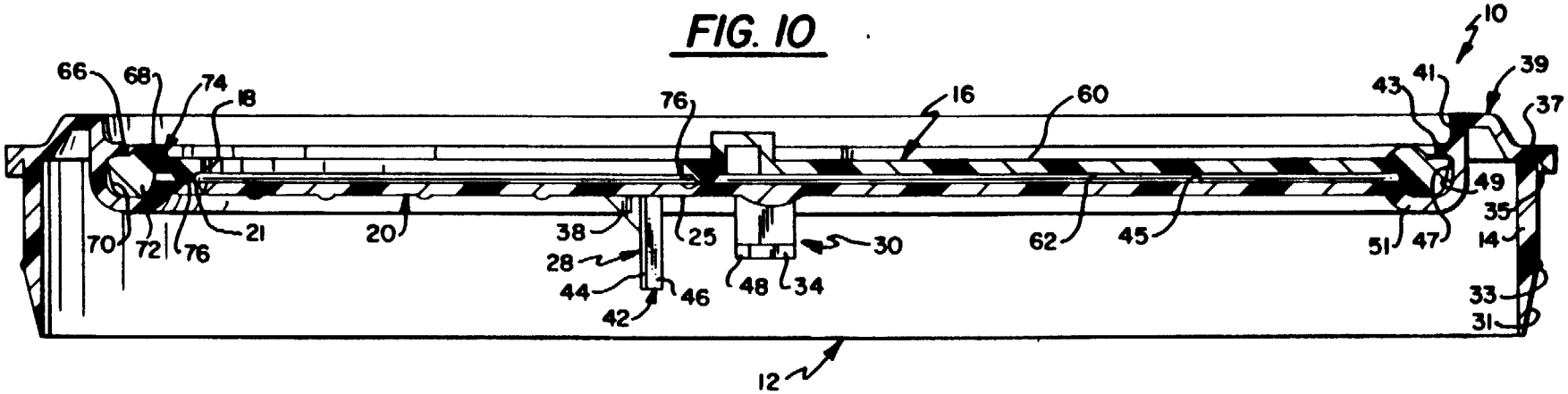
FIG. 10 is a cross-sectional view taken along line 10—10 in FIG. 9.

With specific reference to FIG. 10, which is a cross-section of base 12 and rotor 16, the depending flange 14 is shown as having a tapered or beveled outer surface 31 that extends around the entire periphery of the base to help ease the closure into a container. A series of ribs, one of which is shown at 33, also extend around the depending flange 14 to assist in providing a proper interference fit and to provide additional surfaces for gluing or otherwise attaching the base to a container. The exterior sidewall terminates in an inverted V-shaped slot 35 into which the peripheral end of a container can fit or partially fit depending upon the sidewall thickness of the container. The top surface of the base, as shown in FIG. 10, includes an outer flat ledge 37 that also extends around the entire periphery of the upper surface of the end closure. This provides a surface that can be engaged by the end closure positioning apparatus to help force the closure into a container. In addition, this together with a raised rib structure, generally indicated at 39, provides a way of stacking individual ends as well as containers once the bottom is placed in the container. The front surface of the raised portion 39 is defined by a sloped wall 41 which terminates at a horizontally extending flange 43. Representative dimensions for an end closure designed for an 8 ounce container would provide a flange that is preferably about 1.375 inches in width, about 0.15 inches in height and its upper surface is positioned approximately 0.68 inches from the top of planar surface 45 of the central portion of base 12. Surface 45, as shown in FIG. 10, extends across the top of base 12 and includes no other openings other than that which will ultimately be defined when lid portion 20 is opened.

The portion of the base 12 lying beneath flange 43 is comprised of a vertical wall 47 which flows into a radius groove 49 which then flows directly into the planar surface 45. In a closure for an eight ounce container the radius portions of groove 49 will preferably be about 0.0325 inches and a 0.032 inch flattened area can be provided in the center, as indicated at 51.

Figure 15:
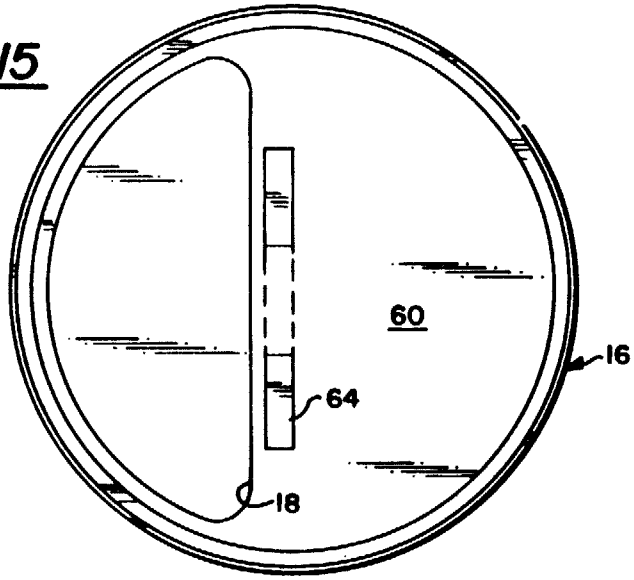
FIG. 15 is a top plan view of the rotor shown in FIG. 8.
Figure 16:
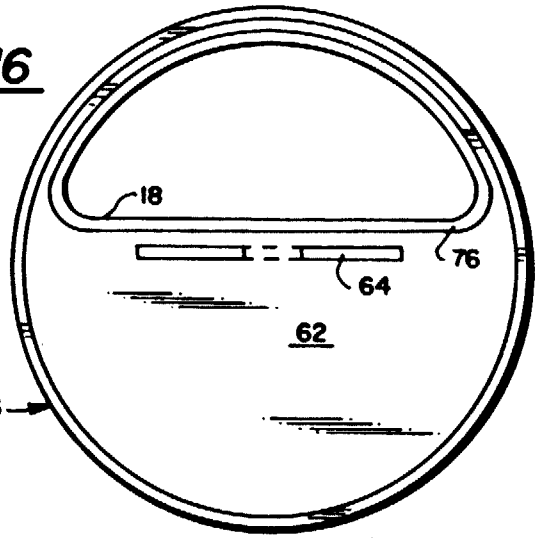
FIG. 16 is a bottom plan view of the rotor shown in FIGS. 8 and 15.

FIGS. 15 and 16 show rotor 16 according to this embodiment of the present invention. The peripheral portion of both the rotor and base as mounted together is shown in FIG. 10.

Turning first to FIG. 15, the rotor 16 is provided with a top surface 60 while its bottom surface 62 is shown in FIG. 16. As noted above, rotor 16 is also provided with a semi-circular or smile type cutout area or opening 18 and a handle member is provided on the top surface such as shown at 64. Handle 64 can be in the form of two separate pieces as shown or one continuous piece. Other shaped handles could also be employed since all that is necessary is that some raised means be provided to turn the rotor 16 relative to the base 12 as indicated by the double arrow shown in FIG. 8.

FIG. 10 is a cross-section of the closure 10 and shows the inner fitting relationship between the rotor 16 and base 12. The marginal edge of rotor 16 has been designed with some specific purposes in mind. Concentrating first on the upper surface 60, the outer periphery includes a substantially flat ledge 66 and inboard from that is a rounded annular rib 68. The outer periphery is defined by a sloping sidewall 70 which has about a 10° slope with sidewall 70 then flowing into an annular ring 72 forming the exterior base of rotor 16. Elements 66–72 can be referred to collectively as a locking ring which is generally designated at 74. As shown in FIG. 10, this locking ring structure 74 fits within base 12 with flange 43 overlying the flat area 66 and with the radius portion 72, which can also include a flattened lower bottom area, lying within the radiused area generally indicated at 49 and 51. The raised rib 68 lies just outside the front edge of flange 43. This not only assures that the rotor 16 is positively held and retained within the base 12, so that it can rotate easily, but the flange 43 provides a seal between the rotor and base both with respect to its bottom surface and the flattened surface 66 on the rotor and also because of the close positioning between the outer edge of flange 43 and rib 68. Additionally, the composite peripheral edge structure of the rotor also helps maintain the flat, planar configuration of the rotor which is important with respect to maintaining a proper seal between rotor 16 and the planar surface 45 of the base.

In an effort to further improve that sealing capability of the rotor, an additional rib 76 is provided on the bottom surface 62 of the rotor relative to surface 45, as shown in FIGS. 10 and 16. Rib 76 extends about the entire periphery of the opening 18 and as in FIG. 10, with opening 18 aligned with lid portion 20, and thus opening 22, rib 76 engages surface 45 about opening 22. Accordingly, the peripheral edge area of rotor 16 along the arched edge of opening 18 is comprised of two adjacent but slightly separated ribs, one being the outer peripheral edge 72, the other being the inner ridge 76. This double rib structure also strengthens the otherwise thin portion of the rotor surrounding the curved portion of opening 18 and also holds the rotor flat. In a frame closure, rib 76 has a depth of approximately 0.020 inches with the outer rib 72 having a depth of about 0.025 inches. The slightly lower depth for rib 76 assures that rib 76 will contact surface 45 and that rib 72 lies completely within its mating groove in base 12. Consequently, the peripheral portion of the rotor extending around opening 18 has a sliding contact with the planar surface 45 of the base. Thus, when the opening 18 is positioned in an aligned fashion over the opening defined by lid 20, rib 76 will be in contact with the portion of surface 45 extending about the opening performed when lid 20 is opened so that upon the pouring of contents from any container containing this closure, rib 76 will provide a seal between the rotor and the base. Material will not flow between the rotor and base. In addition, rib 76 provides additional reinforcing and structural support in rotor 16 about the opening 18.

As rotor 16 is rotated out of alignment with the opening in the base formed when lid portion 20 is open, rib 76 will slide on surface 45 and in a closed position rib 76 rests upon the remaining solid surface portion of the base and continue to remain in sliding contact with surface 45. This assists again in maintaining the flat planar relationship that is desired for the rotor, it helps maintain the seal around the periphery of the rotor between the rotor and the base and also provides a continuing seal about opening 18. This helps maintain freshness of the contents in the container, protects the contents from outside influences and assures that material from within the container will not spill out. In short, rib 76 helps prevent contamination, following opening, of the contents in the container.

Figure 17:
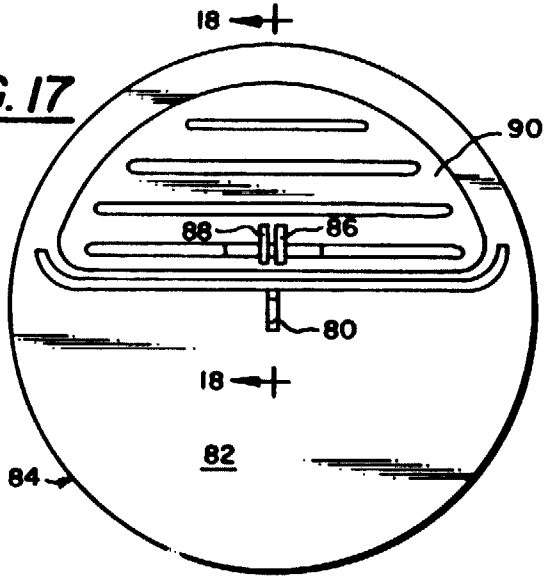
FIG. 17 is a bottom plan view of another embodiment of the present invention.
Figure 18:
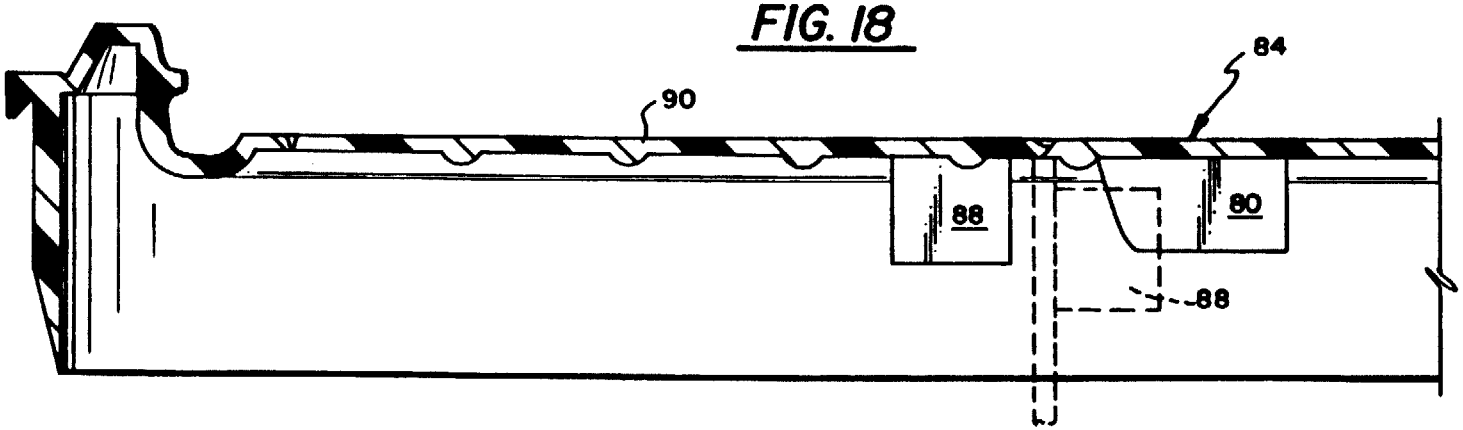
FIG. 18 is a cross-sectional view taken along line 18—18 in FIG. 17.

Another embodiment of the present invention as set forth in FIGS. 17 and 18 is comprised of a similar rotor. However, in lieu of the tabs 28 and the retainers 30, a single depending projection 80 is provided on the bottom surface 82 of the base 84 and two depending members 86 and 88, which are spaced apart a distance slightly less than the width of member 80. Members 86 and 88 are positioned on the flap, as shown in FIG. 17 so that when the flap 90 is opened, as shown in FIG. 18, the pair of members 86 and 88 will frictionally engage and be retained by member 80, thereby holding lid 90 in an open position as shown in dotted lines in FIG. 20. While one pair of members 86 and 88 and one retainer 80 are provided on the bottom surface of the lid and base, respectively, another set of these elements could also be provided with the two sets being positioned adjacent the ends of the lid as is the case with tabs 28 and gripping elements 30 in the first embodiment.

As is apparent from the foregoing, the present invention provides a simple yet advantageous means for retaining the openable lid portion in its open disposition thereby preventing such a hingedly connected lid portion from interfering with access to the container contents.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An end closure for a container comprising:

a substantially planar first lid portion including means for engaging an upper rim of a container to be closed;

a second substantially planar lid portion rotatably mounted to an upper surface of said first lid portion, said second lid portion having an opening defined therethrough, sealing means for sealing about the periphery of the opening between the first and second lid portions; and an openable lid portion defined in said first lid portion, said openable lid portion including a flexible hinge extending along a first edge thereof and a frangible coupling extending along the remaining edges thereof whereby when a force is applied to the upper surface of said openable lid portion, the frangible seal is broken and the openable lid is pivoted about the hinge, a bottom surface of said first lid portion including at least one gripping element, a bottom surface of said openable lid portion including at least one tab element positioned thereon so that when pressure is applied to said openable lid portion and said openable lid portion pivots about said hinge, said gripping element engages said tab so as to retain said openable lid portion in an open disposition.

2. An end closure as in claim 1, wherein said opening defined through said second lid portion is substantially semicircular in shape.

3. An end closure as in claim 1, wherein said openable lid portion is substantially semicircular in shape, said frangible seal being defined along an arc of said semicircular openable lid portion and said hinge portion being defined along the straight edge of said semicircular openable lid portion.

4. An end closure as in claim 1, wherein there are two tab elements defined on said bottom surface of said openable lid portion, adjacent each longitudinal end of said hinge portion.

5. An end closure as in claim 4, wherein there are two gripping elements defined on the bottom surface of said first lid portion, each said gripping element including a substantially vertical portion and an overhanging portion, each said gripping element being defined adjacent a longitudinal end of said hinge element so that when said openable lid portion is pivoted about said hinge, said tab elements are deflected by and snap past said overhanging portion so that said gripping elements engage and lock said tab elements to retain said openable lid portion in an open disposition.

6. An end closure as in claim 1 wherein said at least one tab element is comprised of a depending wall member and wherein said gripping element is comprised of a depending member having an end wall and at least one sidewall, at least one flange extending outwardly from said end wall so as to overhang said at least one side wall a distance sufficient to intercept said tab element.

7. An end closure as in claim 6 wherein said at least one side wall has a first width and said at least one flange has a second width less than said first width.

8. An end closure as in claim 6 wherein said tab element further includes reinforcing means extending between said lid portion and a portion of said wall member for reinforcing said wall member so that the wall member can bend relative to the reinforcing means.

9. An end closure as in claim 6 wherein said wall member includes a side that engages said at least one flange, wherein at least a portion of said side directed toward said at least one flange is beveled.

10. An end closure for a container comprising:

a substantially planar first lid portion including means for engaging [an upper rim of] a container to be closed;

a second substantially planar lid portion rotatably mounted to [an upper surface of] said first lid portion, said second lid portion having an opening defined therethrough[, sealing means for sealing about the periphery of the opening between the first and second lid portions]; and an openable lid portion defined in said first lid portion[, said openable lid portion including] *by* a flexible hinge extending along a first edge thereof and a frangible coupling extending along the remaining edges thereof whereby when a force is applied to the upper surface of said openable lid portion, the frangible seal is broken and the openable lid is pivoted about the hinge, a bottom surface of said first lid portion including at least one gripping element, a bottom surface of said openable lid portion including at least [one tab] *a first* element positioned thereon so that when pressure is applied to said openable lid portion and said openable lid portion pivots about said hinge, said gripping element engages said [tab] *at least first element* so as to retain said openable lid portion in an open disposition.

11. An end closure as in claim 10 wherein said at least first element comprises a flexible tab member and said gripping element comprises a member extending downwardly from said bottom surface terminating at an end having a flange extending radially outwardly therefrom positioned to intercept said tab member.

12. An end closure as in claim 10 wherein said at least first element comprises a pair of spaced apart downwardly extending wall members and said gripping element comprises a member extending downwardly from said bottom surface and having a predetermined width, said pair of members being spaced apart and distance less than said predetermined width so that said gripping element will be frictionally engaged between said pair of members when said lid portion pivots into its open disposition.

*13. An end closure as in claim 1, wherein said sealing means comprises a rib depending downwardly from a bottom surface of said second lid portion.*

* * * * *